MICROWAVE PHASE SHIFTER

Filed Dec. 20, 1968 3 Sheets-Sheet 1

INVENTOR
BY G. C. DI PIAZZA
Walter M. Hill
ATTORNEY

United States Patent Office
3,546,636
Patented Dec. 8, 1970

3,546,636
MICROWAVE PHASE SHIFTER

Gerald C. di Piazza, Randolph Township, Morris County, N.J., assignor to Bell Telephone Laboratories, Incorporated, Murray Hill and Berkeley Heights, N.J., a corporation of New York Filed Dec. 20, 1968, Ser. No. 785,588
Int. Cl. H01p 1/18; H03l 7/04, 7/18
U.S. Cl. 333—31 9 Claims

ABSTRACT OF THE DISCLOSURE

A digital, microwave phase shifter having a plurality of phase shift sections in which each section contains three diodes preferably connected in a pi network with two of the diodes connected in the two shunt branches and the third diode in the series branch. The series branch of the pi network in each section is adapted for assuming an inductive reactance in response to the forward biasing of its diode and for alternatively assuming a capacitive reactance in response to the reverse biasing of its diode. The two shunt branches of the pi network in each section are adapted for assuming capacitive reactances in response to the forward biasing of their diodes and for alternatively assuming inductive reactances in response to the reverse biasing of their diodes. A biasing circuit is provided for either forward biasing or reverse biasing the three diodes in each of the phase shift sections. When the biases are reversed in any section, that section is switched from a low-pass network to a high-pass network, or vice versa, thereby shifting the phase of that section.

GOVERNMENT CONTRACTS

The invention herein claimed was made in the course of, or under contract with The Department of the Army.

BACKGROUND OF THE INVENTION

This invention relates to the wave transmission art and more particularly to a microwave coupling network capable of shifting the phase of a wave passing through it.

Phase shifting networks are currently being used to shift the phase of radar signals for beam steering purposes. In modern radar systems, it is desirable that the phase shifts be accomplished in digital steps to directly utilize the digital steering orders received from the radar computer. Applicant's Patent 3,384,841, granted May 21, 1968, discloses a phase shift device for a coaxial transmission line which is capable of digital control and employs ferrite devices to terminate stubs located along the line one-quarter wavelength apart. The phase is caused to shift when the ferrite material is biased by a current producing an electromagnetic field in the ferrite. United States Pat. 3,290,624 granted Dec. 6, 1966 to M. E. Hines describes a diode phase shifter capable of operation in digital steps in response to bias voltages applied across the diodes. So far as applicant is aware, all prior art broadband diode phase shifters requiring a quarter wave-length spacing between diode pairs along a transmission line also require several such sections to provide the large digital bits. For example, the 180° bit usually requires at least four sections each providing a 45° phase shift, and the 90° bit requires two such sections. The number of sections required for a complete phase shifter and the required quarter wave spacing between the diode pairs in each section results in a rather long structure. The number of sections required for these larger bits is dictated by practical restrictions on the attainable return loss performance of each section and their power handling capability.

It is apparent that if some means can be found to both reduce the number of sections as well as to eliminate the quarter wave-length spacing requirement, the size of the complete phase shifter can be materially reduced. Both of these objectives are realized by the concept of this invention which preferably introduces an additional diode between each diode pair to form a pi network, thereby not only eliminating the quarter wavelength spacing requirement but also achieving a full 180° phase bit in a single three-diode section. Phast shifters made in accordance with the present invention can provide a return loss at least greater than 12 db over an 18 percent bandwidth as against a maximum of about 3 percent bandwidth for the prior load transmission line structures. Moreover, this new concept readily lends itself to fabrication using thin film technology because the coupling lines and stubs are replaced by lumped components.

SUMMARY OF THE INVENTION

This invention comprises a digital, microwave phase shifter having a plurality of phase shift sections in which each section contains three diodes preferably connected in a pi network with two of the diodes connected in the two shunt branches and the third diode in the series branch. The series branch of the pi network in each section is adapted for assuming an inductive reactance in response to the forward biasing of its diode and for alternatively assuming a capacitive reactance in response to the reverse biasing of its diode. The two shunt branches of pi network in each section are adapted for assuming capacitive reactances in response to the forward biasing of their diodes and for alternatively assuming inductive reactances in response to the reverse biasing of their diodes. A biasing circuit always is provided for either forward biasing or reverse biasing the three diodes in each of the phase shift sections. When the biases are reversed in any section, that section is switched from a low-pass network to a high-pass network, or vice versa, thereby shifting the phase of that section.

BRIEF DESCRIPTION OF THE DRAWINGS

The invention may be better understood by reference to the accompanying drawings in which.

DETAILED DESCRIPTION

Figure 1:
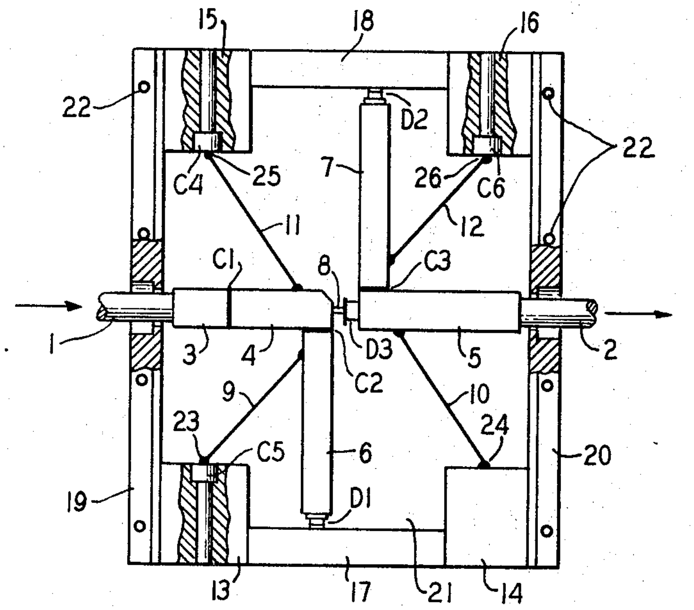
FIG. 1 discloses a physical embodiment of the invention particularly arranged for insertion in a coaxial transmission line.
Figure 2:
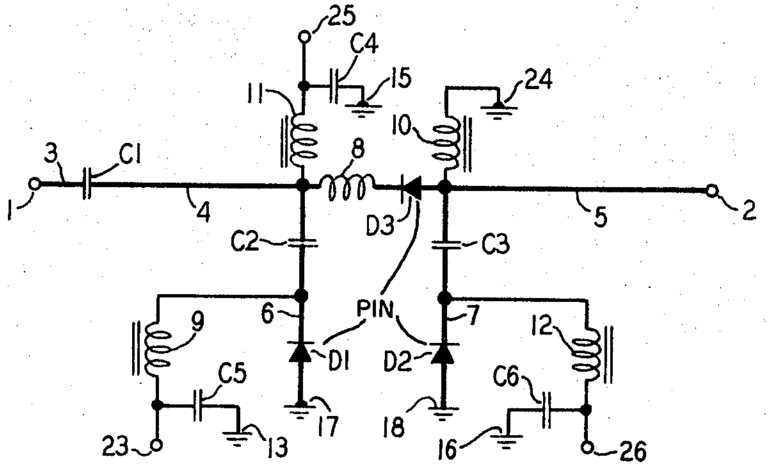
FIG. 2 discloses the circuit schematic provided by the physical elements disclosed in FIG. 1.

The exemplary physical embodiment of the invention shown in FIG. 1 is for insertion in a coaxial transmission line to receive an input signal at input terminal 1 and deliver an output signal at terminal 2, the coaxial line and its connectors being not shown in this figure. The input signal at terminal 1 is transmitted to the input conductors 3 and 4 which are closely coupled together through the low impedance of blocking capacitor C1. The output conductor 5 is coupled to the input conductor 4 through a diode D3 and a small series inductor 8 which also functions in the manner of a section of transmission line. A first shunt branch fractional wavelength line 6 is coupled to input conductor 4 through the low impedance of a blocking capacitor C2 and this line is terminated through a diode D1 connecting its lower end to a conductive ground block 17. Similarly, a second shunt branch fractional wavelength line 7 is coupled to the output conductor 5 through the low impedance of blocking capacitor C3, the upper end of this line being connected to the conductive ground block 18 by way of diode D2. Lines 6 and 7 may have a length slightly exceeding a quarter wavelength at the operating frequency. In one practical embodiment, this length closely approximates one-third of a wavelength so that it transforms and inverts the reactive properties of the diode to make the sign of the shunt branch reactance opposite to that of its diode network. In this examplary embodiment of the invention, the three diodes D1, D2, and D3 are each PIN diodes as is indicated in FIG. 2.

Figure 3:
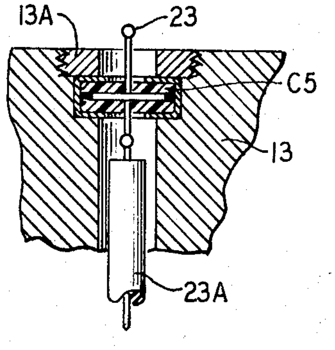
FIG. 3 is a fragmentary sectional view of a typical feed-through capacitor used in the biasing circuits of FIG. 1.

A direct current bias is provided for diode D1 through an isolating choke 9 and a feed-through capacitor C5, the latter being better shown in FIG. 3. The lower end of choke 9 is connected to the bias terminal 23 of the feed-through capacitor while the upper end of choke 9 is connected to the upper end of the first shunt branch fractional wave line 6. A conductive path is thus formed from bias terminal 23, through isolating choke 9, line 6, diode D1 and ground block 17.

Referring momentarily to FIG. 3, it will be noted that the upper portion of the conductive bias receptacle block 13 is shown in fragmentary section. A bias conductor 23A is bought in through the block and connected to the lower terminal of a conventional feed-through capacitor C5, here shown in section with only three plates. It is conventional practice to introduce as many plates as is necessary to obtain the desired capacitance to ground. When the capacitor C5 is inserted in its receptacle, a retaining screw 13A is brought to bear on its case, thereby securing it firmly in place.

Bias for diodes D2 and D3 are similarly obtained, the bias path for diode D2 starting with bias terminal 26 of feed-through capacitor C6, through isolating choke 12, the second branch fractional wavelength line 7, diode D2 and the conductive ground block 18 while the bias path for diode D3 may be traced from terminal 25 of feed-through capacitor C4, through isolating choke 11, input conductor 4, series inductor 8, diode D3, output conductor 5, isolating choke 10 and grounded terminal 24 in the conductive ground block 14. It is to be understood that the metallic input and the output ends 19 and 20, respectively, are electrically and mechanically secured to the bias receptacle blocks 13, 15 and 16 and ground block 14 and these blocks, in turn, are mechanically and electrically secured to ground blocks 17 and 18. A metallic bottom ground plane 21 is also electrically and mechanically secured to this ground structure and, in final assembly, a similar top ground plane, not shown, is secured to the input and output end blocks 19 and 20, respectively, by way of a plurality of screws in threaded holes 22. Input conductors 3 and 4 and output conductor 5 are appropriately spaced from the two ground planes in accordance with conventional practice to provide the desired characteristic impedance.

The circuit structure provided by the embodiment shown in FIG. 1 is shown in FIG. 2 where their corresponding circuit components bear the same reference numerals. The main signal path and the principal network formed by this phase shift section are shown in heavy line which the bias paths are shown in light line. It will be noted that diodes D1, D2 and D3 form a pi network between input terminal 1 and output terminal 2 and that these diodes constitute loads to their respective branches of the pi network. The previous description pertaining to the bias circuits of FIG. 1 applies equally well to FIG. 2 and need not be repeated.

Figure 4:
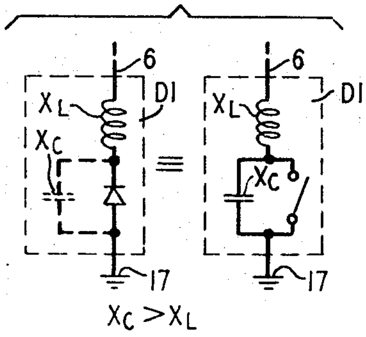
FIGS. 4 and 5 disclose two typical networks formed by the diode circuits used in the present invention.

The schematic diagram of FIG. 2 shows the three diodes D1, D2 and D3 as simple devices whereas at microwave frequencies they are, in effect rather complex resonant networks. A simplified representation of a typical diode network is shown in FIG. 4 where diode D1 of FIG. 2 is shown connected between line 6 and ground 17. The diode is represented as having a series inductive reactance $X_L$ and a shunt capacitive reactance $X_C$, it being understood that the diode symbol in this simplified network is assumed to represent a simple on and off switch. This network is also represented at the right in FIG. 4 where the diode has been replaced by a simple switch symbol. It is also to be understood that at the operating frequency, the capacitive reactance $X_C$ is greater than the inductive reactance $X_L$ so that when the switch is open, i.e., when the diode is reverse biased, the entire diode network presents an equivalent capacitive reactance between line 6 and ground 17. On the other hand, when the switch is closed, i.e., when the diode is forward biased, the capacitive reactance is short circuited so that the network now presents an equivalent inductive reactance. It is thus apparent that when as the bias is reversed the reactance of the network is changed to one of opposite sign. Because the fractional wavelength lines 6 and 7 of FIG. 2 act as transformers, as previously mentioned, the reactances of diodes D1 and D2 are effectively reversed in sign in the shunt branches, a capacitive diode network rendering its shunt branch inductive and vice versa. With diodes of this type connected into the network of FIG. 2 it will then be evident that when all three diodes are reverse biased, the shunt branches of the pi network will be inductive and the series branch will be capacitive. The inductance of the small series inductor 8 may be included with the diode inductance $X_L$ shown in FIG. 4. On the other hand, when these diodes are forward biased, the shunt branches will be capacitive while the series branch including diode D3 will be inductive.

Figure 5:
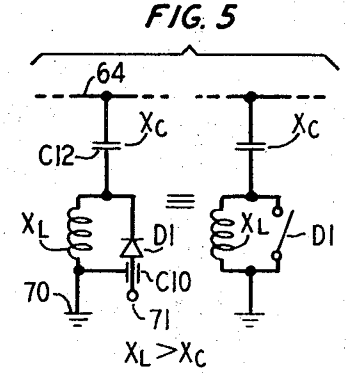

An alternative network may be provided for the diodes by adding external reactances in the manner shown in FIG. 5. This will be described in more detail with reference to FIG. 6 and the reference numerals associated with the schematic at the left in FIG. 5 are those corresponding with diode D1 in FIG. 6. Capacitor C10 is a bypass capacitor whereas capacitor C12 provides a reactance $X_C$ which must be smaller than the inductive reactance $X_L$ at the operating frequency. In this case, when diode D1 is forward biased, it acts as a closed switch to short circuit the inductive reactance $X_L$ rendering the network capacitive whereas, when the diode is reverse biased, it acts as an open switch with the result that the network presents an inductive reactance.

Figure 6:
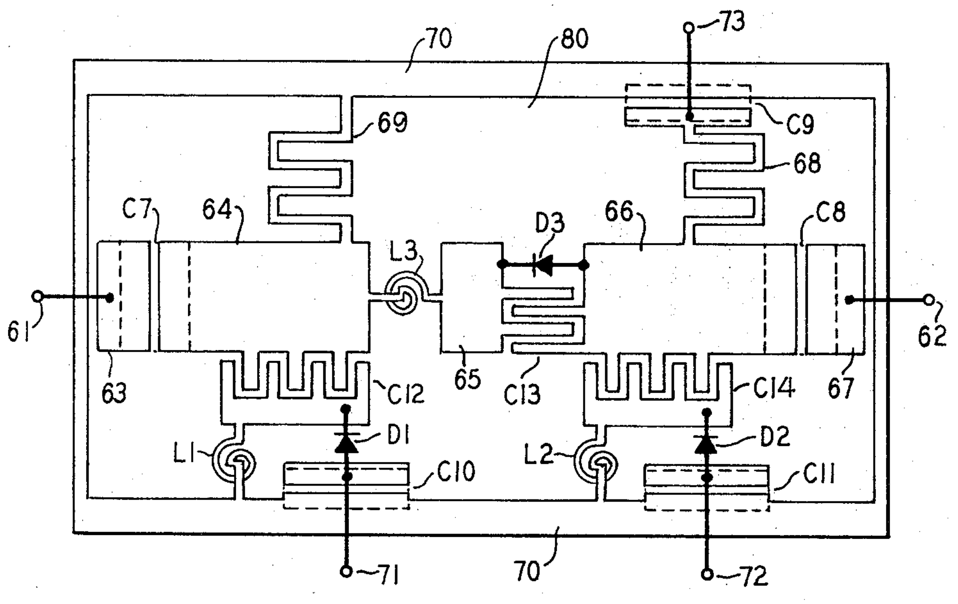
FIG. 6 discloses a thin film version of another embodiment of the invention.

The invention lends itself quite readily to fabrication using thin film technology and one embodiment of the invention representing this technology is disclosed in FIG. 6. The circuit diagram representing the circuits formed by the structure shown in FIG. 6 is disclosed in FIG. 7 and the reference numerals for the corresponding components in the two figures are the same. All the circuit components in FIG. 6, except for the three diodes, are formed of thin film on substrate 80 which is supported by the ground plane 70 surrounding the substrate. Input terminal 61 is coupled to the input conductors 63 and 64, the latter two conductors being coupled together through the low impedance of a blocking capacitor C7. The output conductors 66 and 67 are coupled to output terminal 62 and conductors 66 and 67 are coupled by the low impedance of blocking capacitor C8. Blocking capacitors C7 and C8 are both formed using thin film technology. Capacitor C7, for example, is formed by a conductor placed on the underside of substrate 80 overlapping conductors 63 and 64 as indicated by the dotted outline. Capacitor C8 is formed in the same manner.

Figure 7:
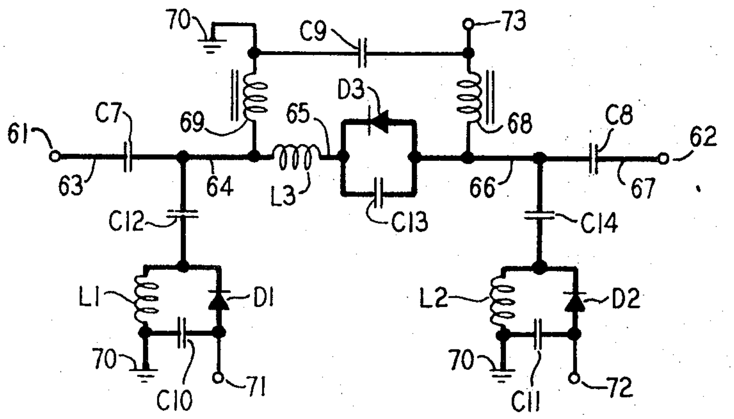
FIG. 7 is a schematic of the networks formed by the physical structure shown in FIG. 6.

Diodes D1 and D2 are placed in the shunt branches of a pi network while diode D3 is in the series branch, as is more clearly shown in FIG. 7. Diodes D1 and D2 employ the diode network configuration of the type shown in FIG. 5, while diode D3 employs the network configuration of the type shown in FIG. 4. With this arrangement, all three diodes are either forward biased or reverse biased to switch the network from one phase condition to the other. As the circuits for diodes D1 and D2 are identical, a description of the circuit for diode D1 will suffice for both. As shown in both FIGS. 6 and 7, the bias circuit for diode D1 starts with bias terminal 71 through diode D1, one terminal of capacitor C12 and to ground 70 by way of inductor L1. Inductor L1 provides the inductive reactance $X_L$ shown schematically in FIG. 5. At the operating frequency, capacitor C10, formed in the same manner as is capacitor C7, by-passes signal currents from the diode to ground. Consequently, when diode D1 is forward biased, inductor L1 is essentially short circuited for signal frequencies. Capacitor C12 is formed by interleaved plates on the same side of substrate 80 in accordance with conventional thin film practice, one set of plates being connected directly to the upper ends of inductor L1 and diode D1 while the other set of plates are formed integrally with conductor 64.

As previously stated, the network for diode D3 is of the type disclosed in FIG. 4 and its bias circuit includes the quarter wavelength meander lines 68 and 69, both of which act as chokes at the operating frequency. The upper end of choke 68 is coupled to ground through by-pass capacitor C9 formed in the same manner as is capacitor C7 while the upper end of choke 69 is directly connected to the ground plane 70. The lower end of choke 68 is connected to conductor 66 while the lower end of choke 69 is connected to conductor 64. Capacitor C13 is formed of interleaved thin film plates on top of substrate 80 in the same manner as are capacitors C12 and C14 and provides part of the capacitive reactance $X_C$ shown schematically in FIG. 4. The diode inductive reactance $X_L$ shown in FIG. 4 is augmented by the inductor L3 shown directly between conductors 65 and 64 in FIG. 6. The conductors 65 and 64 constitute sections of transmission lines.

Separate bias terminals are disclosed in FIGS. 1 and 6 for each of the three diodes. With this arrangement, it is possible to provide individual bias currents to each diode tailored to meet its impedance requirements. One convenient way of providing this current from a single voltage source is to include a separate resistor, not shown, in series with each bias terminal.

The phase shift section shown in FIG. 7 has two alternative states. One state exists when all three diodes in FIG. 7 are forward biased at the same time. Then, due to the fact that the diode D3 in the series branch conforms with the network of FIG. 4 while each of the diodes D1 and D2 in the shunt branches conforms to the network of FIG. 5, the series branch is made inductive and the two shunt branches are made capacitive. The second state exists when all three diodes in FIG. 7 are reverse biased at the same time. Then, the series branch becomes capacitive and each of the two shunt branches becomes inductive. These two states also exist alternatively in the phase shift section shown in FIG. 2 as can be understood by referring to the above description of FIG. 2. Accordingly, these two states are illustrated, schematically in FIG. 8 along with their phase shift characteristics plotted as a function of frequency.

Figure 8:
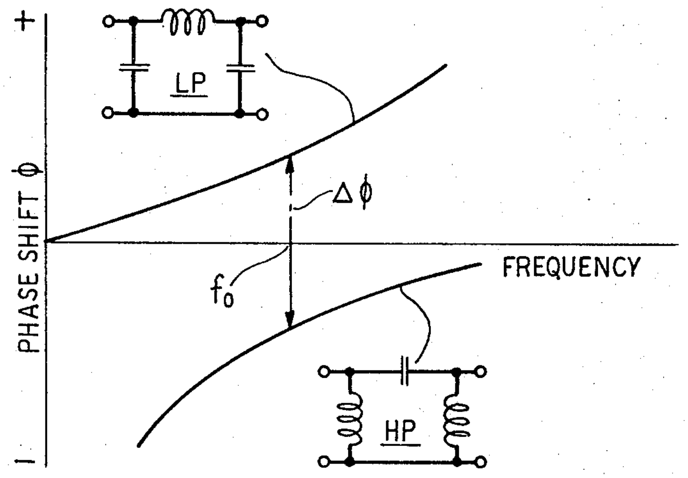
FIG. 8 shows curves representing the phase shift characteristics of the networks provided by the structures shown in FIGS. 1 and 6.

FIG. 8 discloses a typical characteristic for each of the two alternative states of the phase shift sections shown in FIGS. 2 and 7. In either one of these phase shift sections, when its series branch is inductive and its two shunt branches are capacitive, the phase shift section will function in the manner of a low pass filter having the characteristic shown by the upper curve in FIG. 8. When the series branch is capacitive and the two shunt branches are inductive, the phase shift section simulates a high pass filter having the characteristic shown by the lower curve. Thus, each phase shift section has a first state wherein it functions in the manner of a low pass filter and a second state wherein it functions in the manner of a high pass filter. The phase shift sections can be designed so that, at the operating frequency $f_o$, the two curves will run approximately parallel to each other over a considerable frequency range. Moreover, the operating frequency, the low pass network can be made to provide a given positive phase shift but when the biases of its diodes are reversed, the resulting high pass network can be made to provide a negative phase shift of substantially equal magnitude so that the total phase increment is $\Delta\phi$ as shown in FIG. 8. It is evident that, since the two curves run nearly parallel around the operating frequency, a considerable frequency deviation from frequency $f_o$ will not alter the total phase shift increment. Consequently, the resulting phase shift is quite stable with frequency.

Figure 9:
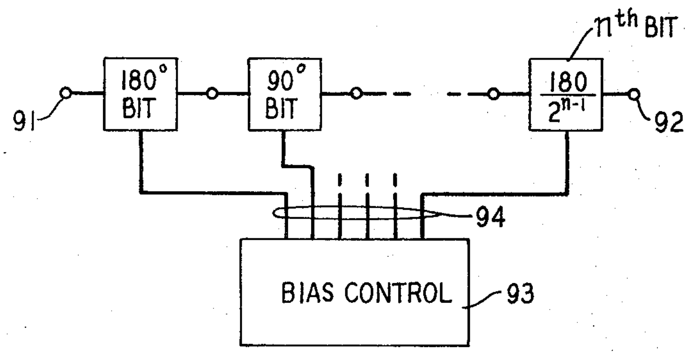
FIG. 9 is a schematic representation of a typical n-bit phase shifter and bias control network in accordance with the present invention.

FIG. 9 shows a schematic of a complete n-bit phase shifter having an input terminal 91 and an output terminal 92. Each of the phase bits or phase shift sections comprises a pi network such as shown in either FIGS. 1 or 6 or their equivalent circuit schematics shown in FIGS. 2 and 7. A bias control circuit in block 93 is coupled through control lines 94 to each of the phase bits. Each of these lines 94 represents a control path including the three conductors, such as conductor 23A of FIG. 3, for controlling the bias currents for the three diodes D1, D2, and D3 in each bit.

Various modifications will be apparent to those skilled in this art. For example, it is obvious that the pi network, specifically disclosed herein to illustrate the invention, can be replaced by an equivalent T-network. Moreover, a varactor diode can replace the PIN diode to change the reactance in any branch of the network to accomplish the same result.

What is claimed is:

1. A digital microwave phase shifter comprising a plurality of phase shift sections, each section comprising a three-branch network of resonant circuits, means for coupling said plurality of sections in series so that the total phase shift is the sum of the phase shifts of all of said sections, each of said sections having instrumentalities for establishing a low pass characteristic therein and for alternatively establishing a high pass characteristic therein, said instrumentalities in each of said sections comprising three diodes each having an anode and a cathode, each of said diodes being coupled in a respectively different one of said resonant circuits with a first one of said diodes having its cathode coupled to the cathode of a second one of said diodes while a third one of said diodes having its cathode coupled to the anode of said second one of said diodes, and biasing means for forward biasing said three diodes and for alternatively reverse biasing said three diodes.

2. The combination of claim 1 wherein one of said three resonant circuits in each of said phase shift sections is adapted for assuming an inductive reactance in response to the forward biasing of said diode coupled therein and for alternatively assuming a capacitive reactance in response to the reverse biasing of said diode, and wherein the other two of said resonant circuits in each of said sections are adapted for assuming capacitive reactances in response to the forward biasing of the respectively associated diodes coupled therein and for alternatively assuming inductive reactances in response to the reverse biasing of said diodes.

3. The combination of claim 1 wherein each of said three-branch networks is a pi network with one of said three branches forming a series branch and with the other two of said three branches forming two separate shunt branches, and wherein each series branch in each of said pi networks includes one of said diodes having an inductor coupled in series therewith, and wherein each of said shunt branches in said pi networks includes a respectively different one of the other two of said diodes with a capacitor coupled in series therewith.

4. The combination of claim 1 wherein at least one of said three resonant circuits in each section effectively constitutes a network having a capacitive reactance in parallel with its diode and an inductive reactance in series with its diode, the capacitive reactance being greater than said inductive reactance at the operating frequency.

5. The combination of claim 1 wherein at least one of said three resonant circuits in each section effectively constitutes a network having an inductive reactance in parallel with its diode and a capacitive reactance in series with its diode, the inductive reactance being greater than said capacitive reactance at the operating frequency.

6. An n-bit digital microwave phase shifter comprising a plurality of phase shift sections coupled in series, each section comprising one digital phase bit, said phase shifter being particularly characterized in that each of said sections comprises a network of three resonant circuits, each of said circuits including a diode adapted for changing the equivalent impedance of its circuit from one kind of reactance to a reactance of opposite sign when said diode is biased from its non-conductive state to its conductive state, and vice versa, and means for forward biasing said diodes in said three resonant circuits and for alternatively reverse biasing said iodes in said three resonant circuits.

7. The combination of claim 6 wherein said three resonant circuits in each of said phase shift sections are disposed in the form of a pi network with one of said three resonant circuits forming a series branch and the other two of said three resonant circuits forming two shunt branches, said resonant circuit forming said series branch having its said diode serially coupled to an inductor by a section of transmission line and further having a capacitor bridged across said diode, and each of said resonant circuits forming said shunt branches having their respective diodes coupled by a respectively associated capacitor to said series branch.

8. The combination of claim 6 wherein at least one of the three resonant circuits in each of said sections effectively constitutes a network having a capacitive reactance in parallel with its diode and an inductive reactance in series with its diode, the capacitive reactance being greater than said inductive reactance at the operating frequency.

9. The combination of claim 6 wherein at least one of the three resonant circuits in each of said sections effectively constitutes a network having an inductive reactance in parallel with its diode and a capacitive reactance in series with its diode, the inductive reactance being greater than said capactive reactance at the operating frequency.

References Cited

UNITED STATES PATENTS

| | | | |
|---|---|---|---|
| 3,356,865 | 12/1967 | Woster | 307—295 X |
| 3,436,691 | 4/1969 | Hoffman et al. | 333—31 |
| 3,453,564 | 7/1969 | Russell | 333—73 (C) X |

PAUL L. GENSLER, Primary Examiner

U.S. Cl. X.R.

307—295, 317; 333—73, 84